United States Patent

Hao et al.

[11] Patent Number: 5,885,483
[45] Date of Patent: Mar. 23, 1999

[54] LONG AFTERGLOW PHOSPHOR AND A PROCESS FOR THE PREPARING THEREOF

[76] Inventors: Qinglong Hao; Pengcheng Li; Jun Li; Baoshan Lu; Jingfeng Gao; Qian Xu, all of 45 Yili, Zhujiafen, Fengtai District, Beijing 100074, China

[21] Appl. No.: 703,152

[22] Filed: Aug. 29, 1996

[30] Foreign Application Priority Data

Aug. 29, 1995 [CN] China .............................. 95 1 09878.0

[51] Int. Cl.[6] ................................................. C09K 11/64
[52] U.S. Cl. ...................................................... 252/307.4 R
[58] Field of Search ....................................... 252/301.4 R

[56] References Cited

U.S. PATENT DOCUMENTS

| | | | |
|---|---|---|---|
| 3,294,699 | 12/1966 | Lange | 252/301.4 R |
| 4,840,747 | 6/1989 | Fan et al. | 252/301.4 R |
| 5,376,303 | 12/1994 | Royce et al. | 252/301.4 R |

FOREIGN PATENT DOCUMENTS

| | | |
|---|---|---|
| 1053807A | 8/1991 | China . |
| 0094132 | 11/1983 | European Pat. Off. . |
| 07011250 | 1/1994 | Japan . |
| 1190520 | 5/1970 | United Kingdom . |

*Primary Examiner*—Melissa Bonner
*Attorney, Agent, or Firm*—Antonelli, Terry, Stout & Kraus, LLP

[57] ABSTRACT

The invention relates to a long afterglow phosphor and a process for preparing the phosphor, characterized in that the phosphor comprises the sinter expressed by a general formula $MO \cdot (n-x)[a\, Al_2O_3{}^{\alpha} \div (1-a)Al_2O_3{}^{\gamma}] \cdot B_2O_3 : R$, where, M represents and alkaline earth metal, R represents a rare earth element, $0.5 < a \leq 0.99$, $0.001 \leq x \leq 0.35$, and $1 \leq n \leq 8$, and a part of M may be replaced with at least one alkaline earth metal selected from Mg, Ca and Ba. R may also use other rare earth elements in addition to Eu as additional activators. The process for preparing the long afterglow phosphor of the present invention comprises several steps, wherein the sintering temperature needs to be 800°–1200° C.

10 Claims, No Drawings

LONG AFTERGLOW PHOSPHOR AND A PROCESS FOR THE PREPARING THEREOF

FIELD OF THE INVENTION

This invention relates to a long afterglow phosphor and a process for the preparation thereof. More particularly, the invention relates to a phosphor material which exhibits long afterglow and high initial brightness when subjected to ultraviolet radiation of 200–450 nm wavelength, and a process for the preparation thereof.

BACKGROUND OF THE INVENTION

Phosphorescent materials are those that can absorb energy when excited by solar, fluorescent and other artificial lights. In particular, when these materials are excited by ultraviolet light, they deviate from their initial equilibrium states, and convert the absorbed energy to visible light after they return to the equilibrium states so as to continue to glow after the excitation has stopped. Material which can maintain a long glowing time is referred to as a "long afterglow phosphor".

Luminous paints applied on watch dials and safe marks have usually been formed by admixing phosphorescent material, using zinc sulfide mixed with copper (ZnS:Cu) as an activator, into paint, ink and the like. The sulfides can absorb energy when excited by ultraviolet light with certain wavelengths and then release the energy in the form of visible light in accordance with the above light-emitting principle of the phosphorescent material. Since the sulfides, however, have a very short span of afterglow, have unstable chemical structures and are not lightproof, there exist many problems when they are used in a practical situation. For example, the visible light emitted by such materials can last only for 20–30 minutes when they are used for luminous watches. There may also be the phenomenon of light decomposition and even loss of light-emitting ability of the material when it is radiated with ultraviolet radiation. Therefore, they can not be used in outdoor environments.

To prolong the time of afterglow, radioactive materials, such as Pm, are sometimes added to give phophors themselves the light-emitting ability. However, with radioactive materials the requirement for the treatment of the materials is very strict, and high costs arise for the aparatus used and the treatment of waste materials such as waste water, so this method is not used at present.

Besides sulfide phosphorescent material, it has been suggested that phosphorescent materials be prepared by adding the rare earth element europium to alkaline earth metal aluminates. For example, U.S. Pat. No. 3,294,699, to Lange, discloses a light-emitting material of strontium aluminate ($SrAl_2O_4$: Eu), in which divalent Eu is utilized as an activator and the amount added is 2–8 mol % of strontium aluminate. This fluorescent material has a light-emitting peak of 520 nm when excited by ultraviolet light. However, this fluorescent material has little afterglow.

Other examples of preparing fluorescent materials by adding other alkaline earth metals to strontium aluminate are disclosed in, for example, UK Patent No. 1,190,520, which discloses a divalent Eu-activated fluorescent material comprising (Ba)x, (Sr)y, (Ca)z, (Eu)p, $Al_{12}O_{19}$ (wherein x+y+z+p=1, one or two of x, y and z may be 0, and $0.001 \leq p \leq 0.1$). This sort of fluorescent material has a light-emitting peak of 380–440 nm wavelength when excited by ultraviolet. The material emits visible light only when excited by ultraviolet light or electrons, and is mainly used in CRT and the like.

Recently, other desirable light-emitting materials which can emit light for long periods when excited by a certain energy have been developed. For example, Chinese Patent Application No. CN 1,053,807A discloses a light-emitting material of long afterglow, which has a general formula of $M\{Sr(1-x)Eu\ x\}O \cdot nAl_2O_3 \cdot yB_2O_3 (1 \leq m \leq 5,\ 1 \leq n \leq 8,$ and $0.001 \leq y \leq 0.35)$. This long afterglow light-emitting material is formed by using oxide of aluminum, strontium and europium, or salts which can produce these oxides when heated, as starting materials, sintering at 1200°–1600° C., and reducing at 1000°–1400° C. under $N_2$ and $H_2$. However, the actual time of afterglow of this light-emitting material of long afterglow is only 4–5 hours, and it has a low initial brightness and poor applicablity.

To solve the above-described problems, the inventors of the present invention have improved the light-emitting combination of activators of alkaline earth metal aluminates and rare earth metals, studied various structures and new crystals, and developed a phosphor which exibits higher initial brightness and longer afterglow than the light-emitting materials of combination of known sulfides and activators of alkaline earth metal aluminates and rare earth metals.

SUMMARY OF THE INVENTION

One of the objects of the present invention is to provide a phosphor having long afterglow and high initial brightness.

The long afterglow phosphor of the invention comprises a sintered material (sometimes referred to as "sinter") having a general formula of:

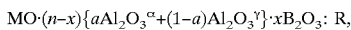

where M represents an alkaline earth metal, R represents a rare earth element, $0.5 < a \leq 0.99$, $0.001 \leq x \leq 0.35$, and $1 \leq n \leq 8$.

Preferably, M is strontium and R is europium.

In the general formula of the long afterglow phosphor of the invention, a part of strontium represented by M may be replaced with at least one alkaline earth metal selected from Mg, Ca and Ba.

A portion of the europium represented by R may be replaced with at least one of metals selected from La, Ce, Pr, Nd, Sm, Gd, Tb, Dy, Ho, Er, Tm, Yb, Lu, Mn and Bi.

The amount of R added is more than 0.001 mol %, and less than 10 mol % of a metal represented by M.

Preferably, $0.8 \leq a \leq 0.9$ and $0.05 \leq x \leq 0.1$.

Another object of the invention relates to a process for preparation of a long afterglow phosphor, comprising the following steps:

(1) stoichiometrically weighting the starting materials;

(2) completely mixing weighted $\alpha$-$Al_2O_3$ and $\gamma$-$Al_2O_3$;

(3) grinding and mixing all weighted materials evenly;

(4) sintering resultant materials at 800°–1200° C. for 2–4 hours;

(5) reducing resultant sinter at 800°–1200° C. for 2–4 hours;

(6) cooling the reduced sinter to ambient temperature;

(7) pulverizing the cooled sinter; and (8) screening the pulverized sinter.

DETAILED DESCRIPTION OF THE PREFERRED EMBODIMENTS

The long afterglow phosphor according to the preferred embodiment of the invention has the general formula:

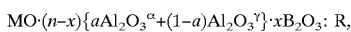

where M is any alkaline earth metal preferably selected from among Sr, Ca and Ba, and R is a rare earth element selected from La, Ce, Pr, Nd, Sm, Gd, Tb, Dy, Ho, Er, Tm, Yb, Lu, Mn and Bi. $0.5 < a \leq 0.99$, $0.001 \leq x \leq 0.35$, and $1 \leq n \leq 8$.

The main component of the sinter is a crystal of a monoclinic system.

The representative sinter of the long afterglow phosphor of the invention is:

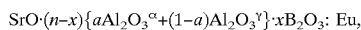

$$SrO \cdot (n-x)\{aAl_2O_3{}^\alpha + (1-a)Al_2O_3{}^\gamma\} \cdot xB_2O_3 : Eu,$$

and exhibits characteristics of long afterglow and high brightness. Specifically, the sinter, which is prepared by mixing strontium oxide, $\alpha$-$Al_2O_3$ ($Al_2O_3{}^\alpha$), $\gamma$-$Al_2O_3$ ($Al_2O_3\gamma$), boron oxide or boron compound and europium oxide activator, and sintering, and is a crystal of monoclinic system. In the sinter, $\alpha$-$Al_2O_3$ ($Al_2O_3{}^\alpha$) is more than 50% to 99% based on total aluminum oxide, $\gamma$-$Al_2O_3$ ($Al_2O_3{}^\gamma$) is less than 50% to 1% based on total aluminum oxide.

Because of different conditions of forming $\alpha$-$Al_2O_3$ and $\gamma$-$Al_2O_3$, and their different chemical structures, a luminescent material composed of the aluminum oxide of different types will produce different crystalline structures which directly affect the luminance characteristics of the luminescent material to result in great differences in luminance. As shown by experiments, the luminescent material having a formula of $MO \cdot (n-x)Al_2O_3{}^\gamma \cdot xB_2O_3$: R comprising 100% (i.e. a =0) $\gamma$-$Al_2O_3$ has no light-emitting characteristic; and the luminescent material represented by $MO \cdot (n-x)Al_2O_3{}^\alpha \cdot xB_2O_3$: R comprising 100% (i.e. a=1) $\alpha$-$Al_2O_3$ has a certain light-emitting characteristic. However, a luminescent material formed by mixing $\alpha$-$Al_2O_3$ and $\gamma$-$Al_2O_3$ exhibits a better light-emitting characteristic, especially the luminescent material of the invention wherein $0.5 < a \leq 0.99$ exhibits excellent light-emitting characteristic, and its initial brightness and afterglow time are better than those of the same type of materials known in the art.

In the present invention, the crystal of $SrO \cdot (n-x)\{aAl_2O_3{}^\alpha + (1-a)Al_2O_3{}^{65}\} \cdot xB_2O_3$ is produced by sintering the mixture of strontium oxide, $\alpha$-$Al_2O_3(Al_2O_3{}^\alpha)$, $\gamma$-$Al_2O_3$ ($Al_2O_3{}^\gamma$) and boron oxide or a boron compound at a high temperature. The resulting crystal is determined to be of a monoclinic system by an XRD test and has not only a long afterglow characteristic but also especially high luminance (brightness) when excited by activators and additional activators. Compared with materials represented by $m(SrI-x\ Eux)O \cdot nAl_2O_3\ yB_2O_3$ and $MNAl_{2-x}B_xO_4$ in the art, it has superior properties.

In the invention, a part of the strontium may be replaced with at least one element selected from Mg, Ca, and Ba if the ratio of combined amount of Sr and Mg and/or Ca and/or Ba to $(n-x)\{aAl_2O_3 + (1-a)Al_2O_3\} \cdot xB_2O_3$ is 1:1. The part of strontium herein refers to a part of total the amount of strontium in the crystal.

When the content of boron used in the invention is 0.001 mol %, there is no effect on the long afterglow property of the crystal; on the contrary, when it is more than 0.35 mol %, the sinter after sintering is converted into a sinter of a boron oxide system, and this has different properties. The preferred content of boron is 0.05–0.1 mol %.

In prior art, for example, European Patent Publication No. 0094132 discloses that boron oxide may be added as a flux during the process for preparation of $SrAl_2O_4$, and the amount added is 0.002–0.1 mol % of Al. If the content of Al is beyond the specified range, the material will not provide the desired effects. In other publications, such as Japanese Patent Publication No. 7-11250, it is disclosed that boron oxide may be added as a flux during the manufacturing of the spinal structure of $SrAl_2O_4$ and the amount of boron oxide added thereto is 1–10% (weight). The amount of boron oxide added is to be limited because it will not provide a fluxing effect if the amount is less than 1% (weight), and the sinter will solidify if more than 10% (weight) is added so that pulverizing and screening procedures thereafter will be very difficult.

Different from materials known in the art, the long afterglow, high brightness phosphor according to the present invention provides a crystal (monoclinic system) different from the spinal structure by adding boron oxide (its ratio to the number of aluminum atom is 0.1–1), so as to result in a phosphor with long afterglow and high brightness, which is different from $SrAl_2O_4$: Eu without long afterglow.

In the present invention, a portion of strontium expressed by M may be replaced with up to 25 mol % Ca. If the Ca content is more than 25 mol %, the crystal will crack. For the same reason, the amount of Ba added is up to 10 mol % of Sr and that of Mg added is up to 30 mol % of Sr. Adding these alkaline earth elements provides phosphors with different luminescent wavelengths. The above-mentioned alkaline earth metal can be used alone or more than two may be used together. When more than two kinds are used, the ratio of the combined amount added to $(n-x)\{aAl_2O_3{}^\alpha + (1-a)Al_2O_3{}^\gamma\} \cdot xB_2O_3$ is 1:1.

The starting materials used to create the high luminance, long afterglow phosphor of the invention are oxides of Sr, Ca, Ba and Mg or salts which can produce these oxides when heated. The activator used in the invention is Eu and the corresponding starting material may be europium oxide or salts which can produce europium oxide when heated.

Additional activators can also be added to increase the luminance of the phosphor of the invention, $MO \cdot (n-x)\{aAl_2O_3{}^\alpha + (1-a)Al_2O_3{}^\gamma\} \cdot xB_2O_3$:R. Additional activators can also be included in addition to Eu for increasing the luminance. The raw materials for the additional activators may be oxides of additional activators or salts which can produce these oxides when heated. For example, it may be one or more of rare earth elements selected from La, Ce, Pr, Nd, Sm, Gd, Tb, Dy, Ho, Er, Tm, Yb, Lu, Mn and Bi. This structure is essentially a crystal of a monoclinic system, which can result in higher luminance effected by rare earth elements.

Among these additional activators, Dy, Nd, Ho and Ce are preferred. The amount of activators and additional activators used is 0.001–10 mol % of M in the formula expressed by $MO \cdot (n-x)\{aAl_2O_3{}^\alpha + (1-a)Al_2O_3{}^\gamma\}xB_2O_3$:R. When the amount of activators and additional activators is less than 0.001 mol %, there will not be realized very good exciting effects, while with more than 10 mol % there will occur an extinguishing phenomenon.

The term "excited by activators and additional activators" in the present invention refers to mixing and firing the oxides of Sr, Al, B or Boron compound and europium oxide as activators and at least one oxide of rare earth element or the compound which can produce those oxides as additional activators.

The process for preparation of the high luminance phosphor will now be described in more detail.

After being completely pulverized, all the raw materials are mixed evenly and the mixture is sintered at 800°–1200° C. The resulting sinter thus obtained is reduced at 800°–1200° C. for 2–4 hours, then cooled down, pulverized and screened (grading) to form the phosphor.

In the process, it is possible to combine two steps, i.e., firing at 80020 –1200° C. and reducing in a reducing atmosphere for 2–4 hours, into one. There is no special restriction on the reducing atmosphere and conventional reducing atmospheres and reducing means may be utilized. As indicated by repeating actual experiments, it is possible to bury the sinter in charcoal powders to isolate it with respect to ambient air so as to create a reducing atmosphere. Since the process of directly reducing with charcoal powders is both economical and safe, it is one of the most preferable reducing methods.

Since the content of boron in the long afterglow phosphor of the invention is relatively high, and its firing temperature is not very high, a conventional charcoal rod electrical furnace will be suitable to attain the desired firing temperature without the need for an expensive electrical furnace with molybdenum disilicides as electrical rods, hence reducing the cost of the devices and the production costs.

The long afterglow phosphor of the invention may be mixed into inks or paints to be used as luminous paints. Because the phosphor of the invention has a high luminance, it has an excellent effect when used as marks in the night, such as pavement marks, pavement central lines and advertisement sheets, and also as back sheets of stationery, toy, sport goods and liquid crystal. As it can slowly release energy absorbed in the daytime to emit light, and it needs no other source of energy.

The present invention will be described in more detail in the following examples. However, the following examples are not intended to limit the scope of the present invention.

EXAMPLE 1

In the structural formula represented by

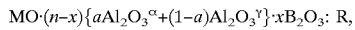
$$MO \cdot (n-x)\{aAl_2O_3^\alpha + (1-a)Al_2O_3^\gamma\} \cdot xB_2O_3: R,$$

M is Sr, a=0.52, x=0.07 and n=1, taking: 14.468 g $SrCO_3$, 4.932 g $Al_2O_3^\alpha$, 4.553 g $Al_2O_3^\gamma$, 0.8 g $H_3BO_3$;

taking: 0.176 g $Eu_2O_3$, as a starting material of the additional activator; and taking: 0.187 g $Dy_2O_3$, as a starting material of the additional activator.

The starting materials were pulverized, mixed sufficiently and then placed in a crucible. The crucible was then placed in an electrical furnace and maintained at 1100° C. under a reducing atmosphere for 3 hours, cooled to 200° C., removed from the electrical furnace, further cooled to ambient temperature, then ball-milled and sieved by a 200 mesh, to give phosphor (1) of the present invention.

EXAMPLE 2

In the structural formula represented by

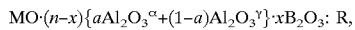
$$MO \cdot (n-x)\{aAl_2O_3^\alpha + (1-a)Al_2O_3^\gamma\} \cdot xB_2O_3: R,$$

M is Sr, a=0.99, x=0.07 and n=1, taking: 14.468 g $SrCO_3$, 9.391 g $Al_2O_3^\alpha$, 0.095 g $Al_2O_3^\gamma$, 0.866 g $H_3BO_3$;

taking: 0.176 g $Eu_2O_3$, as a starting material of the additional activator; and taking: 0.187 g $Dy_2O_3$, as a starting material of the additional activator.

Starting materials were pulverized, mixed sufficiently and then placed in a crucible. The crucible was placed in an electrical furnace and maintained at 1100° C. under a reducing atmosphere for 3 hours, cooled to 200° C., removed from the electrical furnace, further cooled to ambient temperature, then ball-milled and sieved by 200 mesh, to give phosphor (2) of the present invention.

EXAMPLE 3

In the structural formula represented by

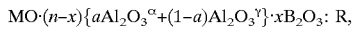
$$MO \cdot (n-x)\{aAl_2O_3^\alpha + (1-a)Al_2O_3^\gamma\} \cdot xB_2O_3: R,$$

M is Sr, a=0.85, x=0.07 and n=1, taking: 144.68 g $SrCO_3$, 80.63 g $Al_2O_3^\alpha$, 14.23 g $Al_2O_3^\gamma$, 8.66 g $H_3BO_3$;

taking: 1.76 g $Eu_2O_3$, as a starting material of the additional activator; and taking: 1.87 g $Dy_2O_3$, as a starting material of the additional activator.

These starting materials were pulverized, mixed sufficiently and then placed in a crucible. The crucible was placed in an electrical furnace and maintained at 1200° C. under a reducing atmosphere for 2 hours, and then at 800°–1000° C. for 2–3 hours (the following is same as in Example 2), to give phosphor (3) of the present invention.

EXAMPLE 4

In the structural formula represented by

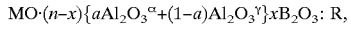
$$MO \cdot (n-x)\{aAl_2O_3^\alpha + (1-a)Al_2O_3^\gamma\} \cdot xB_2O_3: R,$$

M is Sr, a=0.85, x=0.005 and n=1, taking: 14.468 g $SrCO_3$, 8.627 g $Al_2O_3^\alpha$, 1.522 g $Al_2O_3^\gamma$, 0.0618 g $H_3BO_3$;

taking: 0.176 g $Eu_2O_3$ and 0.187 g $Dy_2O_3$, respectively as the starting material of the additional activator.

Phosphor (4) of the present invention was prepared by using the same process as in Example 2.

EXAMPLE 5

In the structural formula represented by

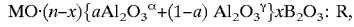
$$MO \cdot (n-x)\{aAl_2O_3^\alpha + (1-a)\, Al_2O_3^\gamma\} \cdot xB_2O_3: R,$$

M is Sr, a=0.85, x=0.35 and n=1, taking: 14.468 g $SrCO_3$, 5.636 g $Al_2O_3^\alpha$, 0.995 g $Al_2O_3^\gamma$, 4.328 g $H_3BO_3$; and taking: 0.176 g $Eu_2O_3$ and 0.187 g $Dy_2O_3$, as the starting material of the activator and additional activator.

These starting materials were pulverized, mixed sufficiently and then placed in a crucible. The crucible was placed in an electrical furnace and maintained at 800°–1200° C. for 2 hours. CO gas was introduced when cooled to 800°–1000° C. After being kept for 2 hours, it was cooled to 200° C., removed from the electrical furnace, further cooled to ambient temperature, then ball-milled and sieved by a 200 mesh, to give phosphor (5) of the present invention.

EXAMPLE 6

In the structural formula represented by

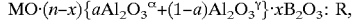
$$MO \cdot (n-x)\{aAl_2O_3^\alpha + (1-a)Al_2O_3^\gamma\} \cdot xB_2O_3: R,$$

M is Sr, a=0.85, x=0.07 and n=2, taking: 14.468 g $SrCO_3$, 16.733 g $Al_2O_3^\alpha$, 2.953 g $Al_2O_3^\gamma$, 0.866 g $H_3BO_3$; and taking: 0.176 g $Eu_2O_3$ and 0.187 g $Dy_2O_3$, as a starting material of the activator and additional activator.

These starting materials were pulverized, mixed sufficiently and then placed in a crucible. The crucible was placed in an electrical furnace and maintained at 800°–1200° C. under a reducing atmosphere for 3 hours, cooled to 200° C., removed from the electrical furnace, further cooled to ambient temperature, then ball-milled and sieved by a 200 mesh, to give phosphor (6) of the present invention.

EXAMPLE 7

In the structural formula represented by

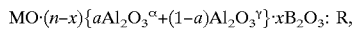
$$MO\cdot(n-x)\{aAl_2O_3{}^\alpha+(1-a)Al_2O_3{}^\gamma\}\cdot xB_2O_3: R,$$

M is Ca, a=0.85, x=0.07 and n=2, taking: 9.809 g $CaCO_3$, 8.063 g $Al_2O_3{}^\alpha$, 1.423 g $Al_2O_3{}^\gamma$, 0.866 g $H_3BO_3$; and taking: 0.176 g $Eu_2O_3$ and 0.187 g $Dy_2O_3$, as a starting material of the activator and additional activator.

These starting materials were pulverized, mixed sufficiently and then placed in a crucible. The crucible was placed in an electrical furnace and maintained at 800°–1200° C. under a reducing atmosphere for 3 hours and at 1300° C. for 2 hours, cooled to 200° C., removed from the electrical furnace, further cooled to ambient temperature, then ball-milled and sieved by a 200 mesh, to give phosphor (7) of the present invention.

EXAMPLE 8

In the structural formula represented by

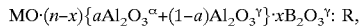
$$MO\cdot(n-x)\{aAl_2O_3{}^\alpha+(1-a)Al_2O_3{}^\gamma\}\cdot xB_2O_3{}^\gamma: R,$$

M is Ca, a=0.85, x=0.07 and n=2.

taking: 9.809 g $CaCO_3$; 16.733 g $Al_2O_3{}^\alpha$; 2.953 g $Al_2O_3{}^\gamma$; 0.866 g $H_3BO_3$;

taking: 0.176 g $Eu_2O_3$ and 0.187 g $Dy_2O_3$, as a starting material of activator and additional activator.

These starting materials were pulverized, mixed sufficiently and then placed in a crucible. The crucible was placed in an electrical furnace and maintained at 800°–1200° C. under a reducing atmosphere for 3 hours and at 1300° C. for 2 hours, cooled to 200° C., removed from the electrical furnace, further cooled to ambient temperature, then ball-milled and sieved by a 200 mesh, to give phosphor (8) of the present invention.

The phosphors (1)–(8) of the invention, as obtained in Examples (1)–(8), and a phosphorescent material (0.2 g each sample) comprising zinc sulfide were placed in a plastic tray with 10 mm diameter. After radiation by a 15w fluorescent lamp at a vertical distance of 20 cm at ambient temperature and 25 RH% moisture, the glow degrees of each sample at various points were determined using a glowmeter (TOPCONBM-5, made by Japan TOPCON Co. Ltd.). The results of the tests are shown in Table 1. The light-emitting wavelengths of each sample are shown in Table 2.

As shown in the test results, under the radiation of a fluorescent lamp, solar light or other source of ultraviolet light, the phosphor of the invention emits a green-blue light with 490–520 nm wavelength. Its initial luminance is more than 10 times that of phosphorescent materials comprising zinc sulfide as in the known art, and the time of visible afterglow is up to 30–70 hours. Therefore, it is a novel phosphorescent material with excellent long afterglow and high brightness. It is also noted from the test results that use of a combination of $\alpha$-$Al_2O_3$ and $\gamma$-$Al_2O_3$ has an effect on the light-emitting characteristic. When the amount of $\alpha$-$Al_2O_3$ and $\gamma$-$Al_2O_3$ is utilized in the range of the present invention, the phosphors have a very good initial brightness and afterglow time. Especially when "a" is 0.8–0.9 in the formula of the invention, the phosphor has the best light-emitting characteristic. Further, the content of boron in the phosphor has a great effect on the light-emitting characteristic of the phosphor and its optimum content x is in the range 0.05–0.1.

It is obvious from Table 1 that for conventional phosphorescent materials including zinc sulfide the afterglow decreases to zero in less than 3 hours. However, phosphors of long afterglow and high brightness per the invention exhibit considerable luminance even after 3 hours. Particularly, those made from a suitable amount of $\alpha$-$Al_2O_3$ and $\gamma$-$Al_2O_3$ mixture have higher efficiency. See the properties of the sample of Example 3.

It is noted in Table 1 that the initial brightness of each of the samples (1)–(5) emitting green light was higher than those of samples (6)–(8) emitting blue light, but that blue light-emitting samples (6)–(8) attenuate slowly and have a longer afterglow.

The long afterglow phosphors of the present invention are activator-excited aluminate sinters containing boron, and their main component is a crystal of a monoclinic system so as to have long afterglow and light brightness characteristics. Also, because the starting materials used are mixture of $\alpha$-$Al_2O_3$ and $\gamma$-$Al_2O_3$, and are excited by the activators and additional activators, the sinter of the invention has higher luminance and afterglow. Long afterglow and high brightness are the two prominent efficiencies exhibited in the present invention.

Although the preferred examples of the invention have been disclosed for illustrative purposes, those skilled in the art will appreciate that various modifications, additions and substitutions are possible without departing from the scope and spirit of the invention as recited in the accompanying claims.

TABLE 1

| time (min) | long afterglow phosphor of the invention | | | | | | | | conventional fluorescent material of zinc sulfide |
|---|---|---|---|---|---|---|---|---|---|
| | Ex. (1) | Ex. (2) | Ex. (3) | Ex. (4) | Ex. (5) | Ex. (6) | Ex. (7) | Ex. (8) | |
| 0.5 | 800 | 3500 | 5300 | 3200 | 2100 | 4850 | 4900 | 4800 | 210 |
| 30 | 17.4 | 75 | 115 | 69 | 45 | 174 | 176 | 168.7 | 6.5 |
| 60 | 9 | 39.6 | 60 | 37 | 22.7 | 68 | 72 | 67.2 | 0.3 |
| 180 | 1.2 | 13.8 | 21 | 12.4 | 8.3 | 30.1 | 34 | 29.2 | 0 |
| 600 | | 1.9 | 3 | 2.1 | 0.7 | 4.2 | 4.6 | 4 | 0 |
| 3000 | | | 1.52 | | | 0.7 | 0.8 | 0.6 | |

TABLE 2

| material property | Ex. (1) | Ex. (2) | Ex. (3) | Ex. (4) | Ex. (5) | Ex. (6) | Ex. (7) | Ex. (8) |
|---|---|---|---|---|---|---|---|---|
| hardness | 6.5 | 6.2 | 6.4 | 6.8 | 6.3 | 7 | 5.2 | 5.3 |
| specific gravity | 3.5 | 3.3 | 3.5 | 3.4 | 3.4 | 3.7 | 3.2 | 3.6 |
| wavelength of light-emitting | 520 | 520 | 520 | 520 | 520 | 520 | 490 | 440 |

We claim:

1. A long afterglow phosphor comprising a sinter represented by a general composition:
$MO \cdot (n-x)\{aAl_2O_3{}^\alpha + (1-a)Al_2O_3{}^\gamma\} \cdot xB_2O_3$: R,
where the amount of R added is 0.001 mol % to 10 mol % of the metal expressed by M, M represents at least one alkaline earth metal, R represents at least one rare earth element, $0.5 < a \leq 0.99$, $0.001 \leq x \leq 0.35$, and $1 \leq n \leq 8$ where the composition comprises $\alpha\text{-}Al_2O_3$, $\gamma Al_2O_3$ and $MO \cdot (n-x) Al_2O_3 \cdot xB_2O_3$:R where x, n and R have the definition above and the amount of R is 0.001–1 mol % of M.

2. The long afterglow phosphor according to claim 1, wherein:
M is strontium, and R is europium.

3. The long afterglow phosphor according to claim 2, wherein:
a part of strontium expressed by M is replaced with at least one alkaline earth metal selected from the group consisting of Mg, Ca and Ba.

4. The long afterglow phosphor according to claim 2, wherein:
a part of europium expressed by R is replaced with at least one metal selected from the group consisting of La, Ce, Pr, Nd, Sm, Gd, Tb, Dy, Ho, Er, Tm, Yb, Lu, Mn or Bi.

5. The long afterglow phosphor according to claim 2, wherein:
$0.8 \leq a < 0.9$, $0.05 \leq x \leq 0.1$.

6. The process for preparing the long afterglow phosphor according to claim 1, comprising the steps of:

1) completely mixing weighted $\alpha\text{-}Al_2O_3$ and $\gamma\text{-}Al_2O_3$;

2) grinding and evenly mixing said mixed aluminum oxides, at least one oxide of an alkaline earth metal or a salt that produces an oxide of an alkaline earth metal, a boron compound including oxygen, and at least one oxide of a rare earth element or a salt that produces an oxide of a rare earth element;

3) sintering the resultant mixture at 800°–1100° C. for 2–4 hours;

4) reducing the resultant sinter at 800°–1100° C. for 4 hours; and 5) cooling the reduced sinter to ambient temperature and pulverizing the same.

7. The process according to claim 6, wherein:
step 4) is directly carried out with charcoal powders.

8. The process according to claim 6, wherein:
steps 3) and 4) are performed simultaneously.

9. The process according to claim 6, wherein:
the at least one alkaline earth metal is selected from a group consisting of Sr, Mg, Ca and Ba.

10. The process according to claim 6, wherein:
the at least one rare earth element is selected from a group consisting of La, Ce, Pr, Nd, Sm, Gd, Tb, Dy, Ho, Er, Tm, Yb, Lu, Mn or Bi.

* * * * *